May 31, 1927.
G. F. PHILLIPS ET AL
1,631,057
HEADLIGHT DIMMING MECHANISM
Filed April 28, 1926
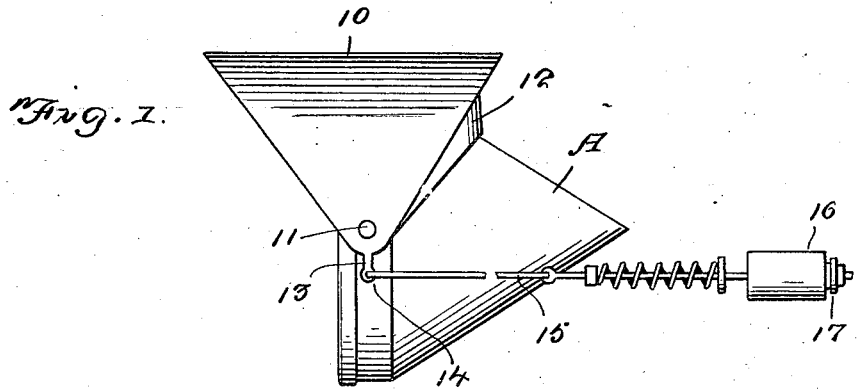
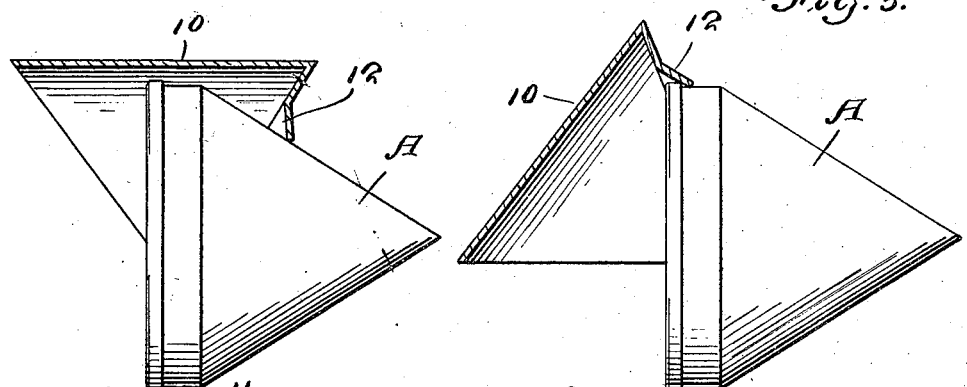
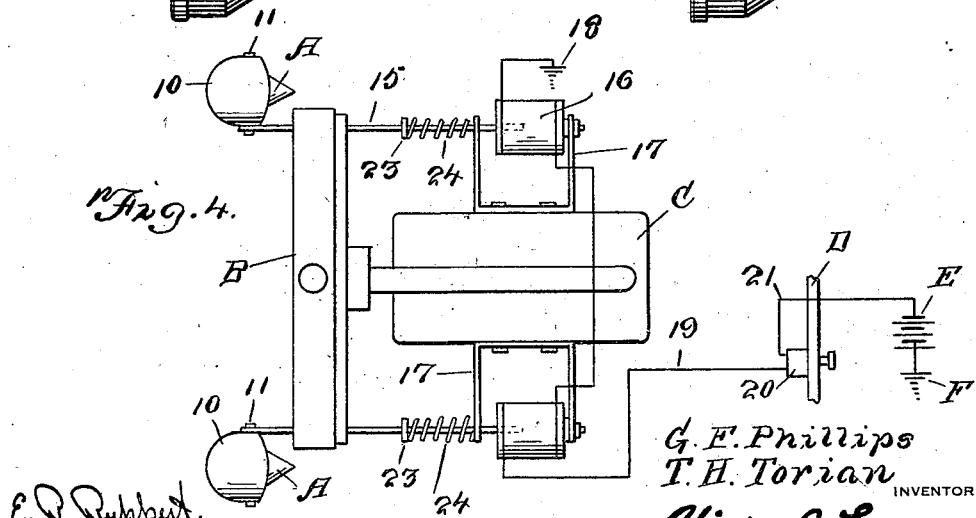
G. F. Phillips
T. H. Torian
INVENTOR
BY Victor J. Evans
ATTORNEY
WITNESS:
E. A. Ruppert.

Patented May 31, 1927.

1,631,057

UNITED STATES PATENT OFFICE.

GEORGE F. PHILLIPS AND THOMAS H. TORIAN, OF PADUCAH, KENTUCKY.

HEADLIGHT-DIMMING MECHANISM.

Application filed April 28, 1926. Serial No. 105,211.

This invention relates to headlight dimming apparatus and has for its object the provision of novel electrically or electromagnetically operated means mounted upon a vehicle and operatively connected with shields or hoods movably mounted with respect to the headlight whereby the operator may, upon approaching another car, cause the shields or hoods to be swung into partially obstructing relation to the headlight so that the rays therefrom will be deflected downwardly onto the ground in advance of the vehicle instead of being permitted to pass straight ahead into the eyes of the operator of the approaching car.

It is well known that many attempts have been made to design headlight lenses which will avoid glare and that many other efforts have been made to accomplish the desired result, but thus far most of the makeshift devices have proved unavailing and useless inasmuch as they are always in operation and it therefore becomes impossible for the operator of the vehicle thus equipped to obtain the full illuminating power of his headlights when necessity arises.

It is with the above facts in view that we have designed the present invention which has for a more specific object the provision of shield or hood devices pivoted upon the headlamp and normally maintained out of obstructing relation to the rays of light therefrom, the hood devices being adapted to be swung forwardly for deflecting the light downwardly upon the mere closing of a current control switch, electromagnetic means being provided for the purpose of effecting swinging movement of the shields or hoods into dimming position, and spring means being provided for normally holding the hoods or shields in inoperative or normal position.

An additional object of the invention is to provide a device of this character which will be simple and inexpensive in manufacture, easy to construct and install, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a side elevation of a headlamp equipped with the shield device and operating mechanism therefor.

Figure 2 is a vertical longitudinal section showing the shield or hood in normal position.

Figure 3 is a view similar to Figure 2 showing the shield or hood tilted forwardly into operative or light obstructing position.

Figure 4 is a diagrammatic plan view illustrating the circuit connections.

Referring more particularly to the drawings, the letter A designates the headlight of an automobile, B represents, diagrammatically, the radiator and C the engine which is, as usual, mounted in advance of the dash or instrument board D. The letter E represents the source of current of the vehicle, generally a storage battery which, as is well known, has one terminal grounded at F. The current connections to the bulbs in the headlights are not shown as they form no part of the present invention and as they may be anything desired or conventional.

In carrying out the invention, we provide a shield or hood 10 for each headlight or headlamp, the shield being constructed of any suitable material such as metal, celluloid or the like and being of such shape in cross section as to embracingly engage about the headlamp. These shields are pivoted to the headlamps at substantially the centers of the latter, as indicated at 11 and they are preferably provided at their rear edges with depending extensions 12 adapted to engage upon the top surfaces of the headlamp for the purpose of maintaining the shields normally in horizontal position so as not to interfere with the emission of light from the lamps. At one side, each of the shields or hoods is provided with a depending extension 13 with which is pivotally connected, at 14, a rearwardly extending rod 15 slidable through the center of a solenoid 16 mounted in any suitable bracket device 17 upon the side of the vehicle or upon the side of the engine C, as may be preferred by the manufacturer or user.

The solenoids 16 are connected in series and one terminal of one is connected with the ground as indicated at 18 while the remaining terminal of the other one of the pair is connected by a conductor 19 with one terminal of a suitable switch device 20 mounted upon the instrument board or dash D, the other terminal of this switch device being connected by a conductor 21 with the source of current E.

In advance of the bracket structure, the rods carry stop collars 23 against which abut coil springs 24 which also engage against the adjacent bracket members, these coil springs being provided for the purpose of normally holding the rods 15 in their forwardmost positions with the shields or hoods 10 in normal or horizontal position so as to be in non-obstructing relation to the rays of light issuing from the lamps.

In the operation of the device, it will be seen that under normal circumstances the solenoids are deenergized and the hoods or shields 10 remain in horizontal position with the extensions 12 thereof engaging against the upper sides of the head lamps. Whenever the driver approaches another car and wishes to dim his lights to avoid blinding or dazzling the other driver, it is merely necessary that he close the switch 20 so as to energize the solenoids 16. When this is done, the rods 15 will be drawn into the solenoids, resulting in rearward longitudinal movement of the rods 15 and consequent forward tilting movement of the shields or guards 10 into the position shown in Figure 3. When this is done, it is clear that the light issuing from the lamps will strike against the inner or under surfaces of the hoods or reflectors and will be deflected downwardly directly upon the roadway in advance of the vehicle so as to provide adequate illumination for the driver while at the same time the rays cannot project out horizontally into the eyes of the approaching driver. The device is consequently a great safeguard to the motoring public and will insure compliance with the regulations existing in many communities. It is really believed that the construction, operation and advantages will be readily apparent to one skilled in the art without further explanation.

While we have shown and described the preferred embodiment of the invention, it should be understood that we reserve the right to make such changes in the form, construction and arrangement of parts as will not depart from the spirit of the invention, or the scope of the subjoined claims.

Having thus described the invention, we claim:—

1. A dimming device for an automobile headlamp, comprising a visor curved in cross section and straddlingly engaged over the headlamp and pivoted thereto at substantially its intermediate portion, said visor being provided below its pivot with a downwardly extending crank arm, rearwardly extending means connected with said crank arm for swinging the visor downwardly, spring means normally maintaining the visor in horizontal position in non-obstructing relation to the rays of light issuing from the lamp, and a depending vertical flange at the rear end of the visor acting as a stop for maintaining the visor normally in horizontal position and being adapted to engage the top of the lamp at the lens retaining rim for limiting the downward swinging movement of the visor.

2. In a dimming device for automobile headlamps, a visor pivoted upon the headlamp and adapted to be moved into obstructing relation with the light issuing therefrom, depending crank arms on the visor, a horizontally disposed rearwardly extending rod pivotally connected with the crank arm, a solenoid arranged in horizontal position, means for supporting the solenoid upon the automobile, said rod being slidable through the solenoid and the supporting means therefor, an abutment element on the rod, and a coil spring surrounding the rod and having one end engaging against said abutment element and its other end engaging against one of the supporting means for the solenoid for normally maintaining the visor in normal position.

In testimony whereof we affix our signatures.

GEO. F. PHILLIPS.
THOMAS H. TORIAN.